United States Patent [19]
van der Lely

[11] 4,036,303
[45] July 19, 1977

[54] SOIL CULTIVATING MACHINES

[75] Inventor: Ary van der Lely, Maasland, Netherlands

[73] Assignee: C. van der Lely N. V., Maasland, Netherlands

[21] Appl. No.: 613,901

[22] Filed: Sept. 16, 1975

[30] Foreign Application Priority Data

Sept. 18, 1974 Netherlands .................. 7412332

[51] Int. Cl.² ............... A01B 33/06; A01B 61/04
[52] U.S. Cl. ............................ 172/49; 172/59; 172/709; 172/706; 172/253; 172/264
[58] Field of Search ............... 172/59, 709, 49, 706, 172/264, 261, 253

[56] References Cited
U.S. PATENT DOCUMENTS

| 518,363 | 4/1894 | Brookens | 172/59 |
|---|---|---|---|
| 696,262 | 3/1902 | Palmer | 172/59 X |
| 1,656,838 | 1/1928 | Smith | 172/709 |
| 2,521,417 | 9/1950 | Sefcovic | 172/59 |
| 2,725,811 | 12/1955 | Hollis | 172/709 X |
| 3,367,425 | 2/1968 | Heeren | 172/59 X |
| 3,616,862 | 11/1971 | van der Lely | 172/59 X |
| Re. 25,237 | 9/1962 | Heeren | 172/59 X |

Primary Examiner—George J. Marlo
Attorney, Agent, or Firm—Mason, Mason & Albright

[57] ABSTRACT

A soil-cultivating machine has an elongated frame that extends horizontally and transverse to the direction of travel. A row of adjacent soil-working members are mounted on corresponding upwardly extending shafts which are geared to a common drive shaft and the members are driven in relative opposite directions to work a broad path of soil. Alternate soil-working members are slideable along beams of the frame so that debris does not jam the drive connections. The drive to the soil-working members includes an imput shaft to a gear box, which can comprise a reduction gear, and an elongated drive shaft that extends parallel to the frame and along which the slideable members are displaceable. The corresponding gears to the working members includes a pinion transmission on the drive shaft which is slideable within limits defined by an elongated key arrangement. Compression springs bias each slideable working member to a normal central position.

12 Claims, 3 Drawing Figures

SOIL CULTIVATING MACHINES

When known soil cultivating machines having a row of tined working members rotating about upright axes are employed on soil having a great many stones or similar obstacles, stones getting in between two adjacent rotors tend readily to cause damage to the tine fastening structures and the tines. In the present construction such damage can be avoided in an effective manner; one working member being permitted to deflect with respect to an adjacent working member to an extent such that a stone getting in between these two adjacent working members is readily released.

Figure 1:
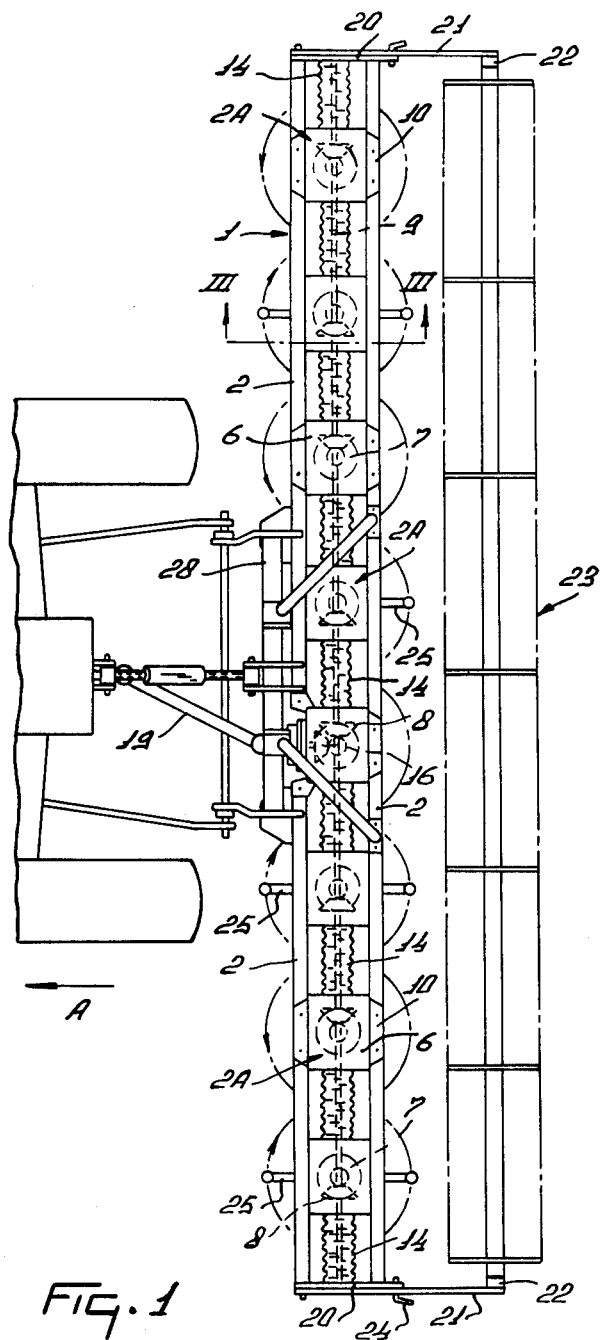
Figure 2:
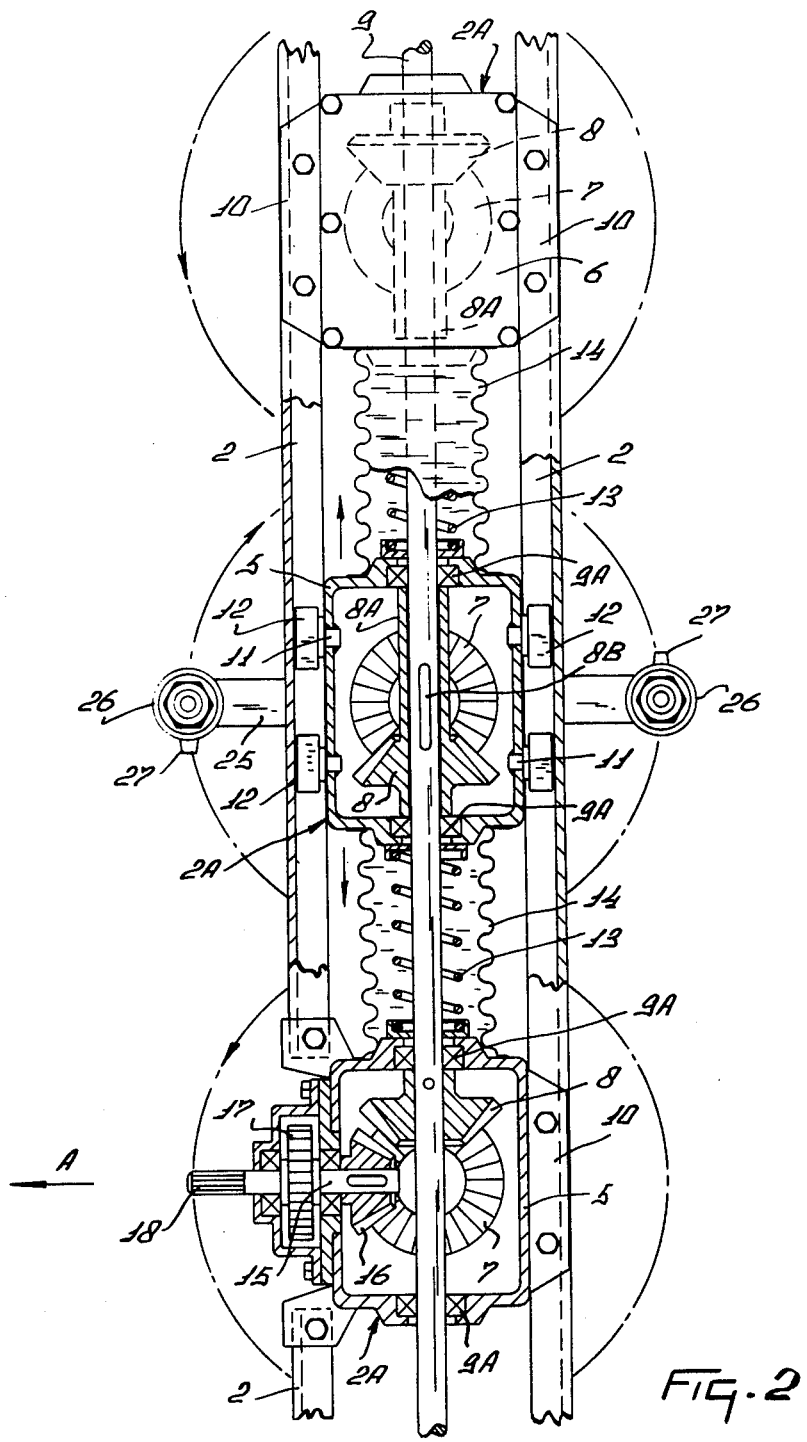
Figure 3:
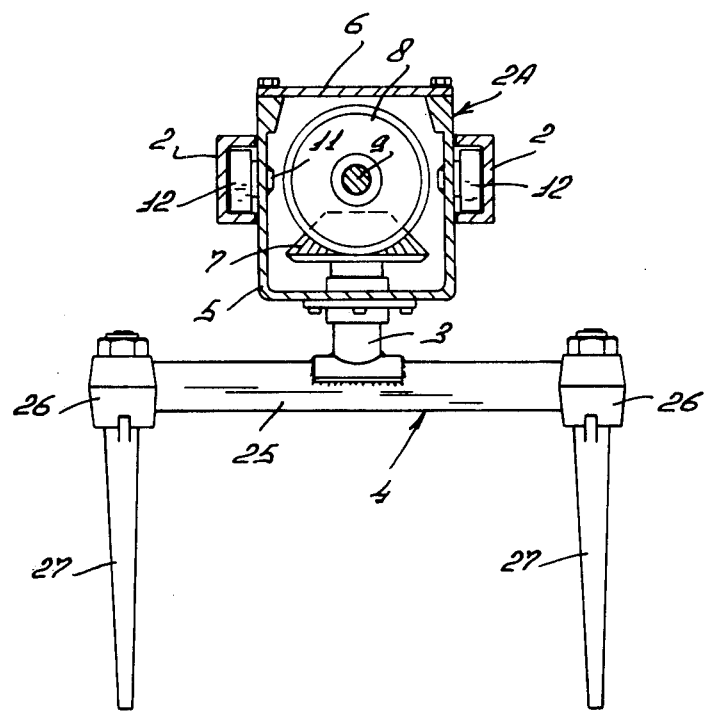

For a better understanding of the invention and to show how the same may be carried into effect, reference will now be made, by way of example, to the accompanying drawings, in which:

FIG. 1 is a schematic plan view of a soil cultivating machine, shown hitched to a tractor, FIG. 2 is an enlarged partly sectional view of part of the plan view of FIG. 1, FIG. 3 is an enlarged elevational view taken on the line III—III in FIG. 1.

The machine shown in FIG. 1 has a frame 1, extending substantially horizontal and transversely of the intended direction of operative travel A of the machine, and including two channel-section frame beams 2 spaced apart from one another in the direction front to rear. The limbs of the channel-section frame beams 2 extend horizontally and face one another. Between the frame beams 2 supports 2A are arranged at equal distances from one another of, preferably, 30 to 40 cms for eight working members 4. These members 4 are adapted to rotate about upright shafts (FIG. 3). The supports are alternately stationary and displaceable with respect to the frame beams 2.

Each support 2A includes a housing 5 having on the top a detachable plate 6 and accommodating the shaft 3 of a working member 4 (FIG. 3). Inside the housing 5 each shaft 3 is connected by means of a bevel gear wheel 7 with a bevel gear wheel 8 on a shaft 9. The shaft 9 is journalled in the respective housings 5 of the supports 2A by means of bearings 9A, and extends midway between and parallel to the frame beams 2.

The bevel gear wheels 8 in the housing 5 of the displaceable supports 2A are provided each with a sleeve 8A (FIG. 2), which together with the gear wheel 8 is slideable along the shaft 9, when the location of a support is shifted. The gear wheel 8 with the sleeve 8A is secured against rotation by means of a key 8B.

The stationary supports 2A are provided on the front and rear with flanges 10 bolted to the frame beams 2. The front and rear of the housing 5 of each displaceable support 2A is provided with spaced-apart stub shafts 11. Each stub shaft carries a roller 12 engaged within the limbs of the adjacent channel section frame beam 2. The outer face of each roller 12 is located substantially at the web between the limbs of the beam 2 in which the roller is engaged.

Between the housings 5 of the displaceable supports 2A and the housings 5 of the fixed supports 2A the shaft 9 is surrounded by compression springs 13 bearing on the sidewalls of the housings in which the bearings 9A for the common drive shaft 9 are accommodated. Each of the compression springs 13 is surrounded by a bellows 14.

The disposition of the bevel gear wheels 8 on the common drive shaft 9 is such that adjacent working members 4 are rotated in operation in opposite senses about their respective shafts 2.

One of the housings 5 of a support 2A located near the center is provided with a shaft 15, extending in the direction of travel A and projecting from the front of the housing, this shaft 15 being drivably connected by means of a bevel gear wheel 16 with the bevel gear wheel 7 and through a change-speed gear 17 with a shaft 18 which can be coupled (as illustrated) through an auxiliary shaft 19 with the power-take-off shaft of a tractor moving the machine.

At the ends the frame beams 2 are interconnected by means of sector-shaped plates 20, the tapering ends of which are located at the front where arms 21 extending along the plates 20 to the rear are pivotally carried by stub shafts. The rear ends of the arms 21 are provided with bearings 22 receiving the ends of a rotatable supporting member 23, extending transversely of the direction of travel A and thus parallel to the frame beams 2 and having a plurality of elongated elements (not shown). By means of pins 24, passed through holes in the arms 21 and through selected ones of plurality of holes on the rear parts of the sector-shaped plates 20, the position of the arms 21 and hence the position of the supporting member 23 can be varied so that the working depth of the working members 4 can be regulated.

Each working member 4 has a substantially horizontal support 25 near the ends of which tines 27 are arranged in holders 26 (FIG. 3).

Near the center the foremost frame beam 2 is provided with a trestle 28, by means of which the machine can be attached to the three-point lifting device of a tractor, as illustrated.

In operation the machine is attached by means of the trestle 28 to the three-point lift of the tractor and through the auxiliary shaft 19 and the change-speed gear 17 the common drive shaft 9 for the working members 4 can be driven so that the respective adjacent working members rotate in the directions of the arcuate arrows in FIGS. 1 and 2. The tines 27 of the adjacent working members 4 thus work overlapping strips of soil. As stated above, the working depth can be adjusted by means of the rotatable supporting member 23 at the rear, which is adjustable in the direction of height.

In operation the displaceable supports 2A for the working members 4 can deflect laterally to either side of their normal central positions shown in FIG. 2 if stones or the like are tending to become jammed between the tines of adjacent working members. By this displacement in the direction of the row of working members along straight lines the stones can be readily released and damage of the tines and the tine fastening structures of the working members 4, which is otherwise likely to occur on stony soil, is minimised.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil-cultivating machine comprising an elongated frame and a plurality of adjacent soil-working members mounted on said frame in row that extends horizontally and transverse to the direction of travel, said soil-working members during operation, being positioned side-by-side and working overlapping strips of soil, said members being rotatably mounted on corresponding upwardly extending shafts and driving means including a pinion transmission means engaging the shafts of said soil-working members and rotating same about upwardly extending axes defined by said shafts, displaceable means interconnecting at least one of said soil-working members to said frame and said soil-working member, its upwardly extending shaft and a respective pinion transmission connection as a unit, being displaceable out of a normally central position and deflectable in a generally horizontal direction against resilient opposition in either one of two opposite directions, with respect to a neighboring soil-working member.

2. A soil-cultivating machine as claimed in claim 1, wherein said driving means comprises a substantially horizontal drive shaft that engages the upwardly extending shaft of said one soil-working member through a pinion transmission and the latter is displaceable along said drive shaft.

3. A soil-cultivating machine as claimed in claim 2, wherein said drive shaft extends parallel to beams of said frame and mounts respective pinion gears that are connected to the soil-working member shafts.

4. A soil-cultivating machine as claimed in claim 1, wherein the respective shaft for said one soil-working member is carried on a sleeve support and the latter is displaceable with respect to said frame, said support slideably cooperating with at least one guide member on beam means of said frame.

5. A soil-cultivating machine as claimed in claim 4, wherein said support has rollers at the front and rear thereof, with respect to the normal direction of travel, said rollers cooperating with guide members on said beam means.

6. A soil-cultivating machine as claimed in claim 5, wherein said support houses said pinion transmission means and the latter is connected to an elongated common drive shaft, said support, together with transmission means being displaceable along the length of said drive shaft.

7. A soil-cultivating machine as claimed in claim 6, wherein at least one compression spring bears on said support and biases said one soil-working member to a central normal working position, said spring being positioned between said one soil-working member and a neighboring soil-working member.

8. A soil-cultivating machine as claimed in claim 7, wherein said compression spring encircles said common drive shaft.

9. A soil-cultivating machine as claimed in claim 1, wherein a common drive shaft is journalled in an elongated frame portion and a plurality of said soil-working members is slideably mounted with corresponding sleeve supports on said common drive shaft, said plurality of working members being deflectable within said frame portion along the length thereof.

10. A soil-cultivating machine as claimed in claim 9, wherein the sleeve support of a soil working member is located near the center of said frame portion and that support comprises an imput drive shaft that drivenly engages said common drive shaft, said imput shaft being connectable to the power take-off shaft of a tractor.

11. A soil-cultivating machine as claimed in claim 1, wherein a roller is pivotably connected to said frame and is located to the rear of said soil-working members, setting means interconnecting said roller to the machine for adjusting the position of said roller relative to said frame.

12. A soil-cultivating machine comprising an elongated frame portion and a plurality of adjacent soil-working members mounted on said frame portion in a row that extends horizontally and transverse to the direction of travel, said soil-working members being rotatably mounted on corresponding upwardly extending shafts and normally positioned to work overlapping strips of soil during operation, driving means connected to the shafts of said soil-working members to rotate same about upwardly extending axes defined by said shafts, alternate soil-working members being slideable on said driving means and displaceable along the transverse length of said frame portion spring means on said frame portion biasing said alternate members to normal central positions between neighboring non-displaceable soil-working members, coupling means on said machine being positioned for connection to the rear of a prime mover.

* * * * *